Patented Nov. 28, 1950

2,531,396

UNITED STATES PATENT OFFICE 2,531,396

ELASTOMER REINFORCED WITH A MODIFIED CLAY

Lawrence W. Carter, New York, and John G. Hendricks and Don S. Bolley, Brooklyn, N. Y., assignors to National Lead Company, New York, N. Y., a corporation of New Jersey No Drawing. Application March 29, 1947, Serial No. 738,234

13 Claims. (Cl. 260—41.5)

This invention relates to reinforced elastomers and processes of compounding the same. One of the objects of this invention is to provide a novel reinforced elastomer.

Another object is to provide a process of producing such an elastomer.

Further objects will appear from the detailed description in which will be set forth a number of embodiments of this invention; it is to be understood, however, that this invention is susceptible of various embodiments within the scope of the claims.

Generally stated and in accordance with illustrative embodiments of this invention, a reinforced elastomer is produced which contains a modified clay originally exhibiting a substantial base-exchange capacity in which the inorganic cation has been replaced by a substituted organic onium base of the character hereinafter described. In the process of compounding the elastomer, the elastomer base is united with the modified clay in a manner to retain the general physical characteristics of elastomer but so as to reinforce the same. This can be accomplished by precipitating a dispersion or emulsion of the elastomer base in the presence of a suspension of the modified clay.

The elastomer base may be a suitable one adapted for this purpose, viz., a natural rubber latex, latices of butadiene copolymers, polychloroprene, polyisoprene, polyvinyl and polyvinylidine compounds.

The clays which are useful as starting materials for making the modified clay in accordance with this invention are those exhibiting substantial base-exchange properties and containing cations capable of more or less easy replacement. Examples of the application of bentonite and hectorite to the present invention are set forth in detail in a later section. The term "clay" as herein used includes montmorillonite, viz., sodium, potassium, lithium and other bentonites, particularly of the Wyoming type; magnesium bentonite, sometimes called hectorite and saponite; also nontronite and attapulgite, particularly that of the Georgia-Florida type, and halloysite. These clays, characterized by an unbalanced crystal lattice, are believed to have negative charges which are normally neutralized by inorganic cations. As found in nature, therefore, they exist as salts of the weak clay-acid with bases such as the alkali- or alkaline-earth metal hydroxides. Bentonites which are particularly useful are the swelling bentonites of the Wyoming type and the swelling magnesium bentonites of the hectorite type.

The base-exchange capacities of the various clays enumerated run from a low of about 10 to a high of about 100, based upon milliequivalents of exchangeable base per 100 grams of clay. Montmorillonites have comparatively high base-exchange capacities, viz., 60–100; and halloysite has comparatively low base-exchange capacity, viz., 6–15; attapulgite has higher base-exchange capacity, viz., 25–35. Generally speaking, those clays which have a high base-exchange capacity are most useful in the present invention.

The replacement of the above mentioned cationic groups of base-exchanging clays by basic organic amines and salts thereof has been recognized and this replacement is sometimes referred to as a "base-exchange" reaction. The preparation of such onium-clay combinations, for instance bentonite-strychnine, bentonite-piperidine, and bentonite-amylamine, has been described heretofore. These base-exchange reactions proceed, in all probability, by means of displacement of the mentioned inorganic cations by the organic cations, as follows:

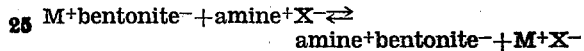

where M represents replaceable inorganic base such as the alkali- and alkaline-earth metals, e. g., sodium, potassium, calcium, etc., as well as hydrogen; and X represents the anion of the amine salt such as chloride or acetate, and the like. The forward reaction is favored by the slight dissociation or "insolubility" of the amine-bentonite combination. As a specific example of the combination of an amine salt, triethanolamine hydrochloride, with a sodium bentonite, the following equation (substitution) is suggested:

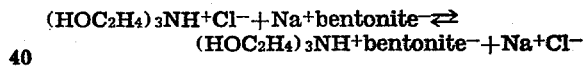

Bentonite and other clays, acid treated to convert them to the hydrogen form, i. e., the replacement of the alkali- or alkaline-earth cation with hydrogen, will combine with basic amino compounds, having a mechanism which is apparently analogous to a neutralization (as the replacement reaction formulated above is analogous to a double decomposition), no ion-exchange apparently taking place, but both the organic amine and the inorganic earth sharing the proton or hydrogen ion which was taken on by the earth during the acid treatment thus (addition):

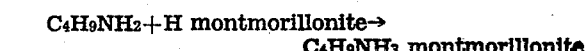

In accordance with this invention, it is not necessary that the inorganic cation of the clay be completely replaced by the onium base; some of the objects and useful results of this invention may be attained by partial replacement.

Generally stated and in accordance with an illustrative embodiment of this invention, the modified clay filler is the reaction product of a clay exhibiting substantial base-exchange capacity and such "onium" compounds as amine salts, ammonium compounds, pyridinium compounds and phosphonium compounds.

An "onium" compound has been defined in Hackh's Chemical Dictionary, Second Edition, as:

"A group of organic compounds of the type $RXH_y$ which are isologs of ammonium and contain the element X in its highest positive valency, viz., where X is pentavalent as in ammonium, phosphonium, arsonium and stibonium; where X is tetravalent as in oxonium, sulfonium, selenonium and stannonium compounds and where X is trivalent as in iodonium compounds; and that they may be considered addition compounds of oxonium, carbonium, stibonium, c. f., -inium, -ylium."

The processes of the present invention embrace the type reaction wherein base-exchanging clays generally are combined with such onium compounds as aliphatic, aromatic and heterocyclic amines, primary, secondary and tertiary amines, polyamines, quaternary ammonium compounds and other onium compounds such as phosphonium compounds. Due to the small average particle size of bentonite, particularly when dispersed in aqueous media, and to the great external surface consequently available for the base-exchange reaction, this material is particularly well adapted for use in the practice of the present invention which, however, is not limited in scope to this base-exchanging clay.

Certain general observations may be made at this point addressed to those skilled in the art for their guidance in the practice of the illustrative embodiments of this invention. First, generally speaking, the more basic the amine the more readily it will enter the base-exchange reaction. Second, when the amine does not readily react, the conversion of the amine to the salt thereof, for instance the chloride or acetate, will facilitate the combination thereof with base-exchanging clays. For example, aniline itself does not readily react with bentonite, but when converted to the phenylammonium chloride, it will enter into a replacement reaction with bentonite. Where the base-exchanging clay contains an alkali or alkaline earth metal cation, it is desirable to employ an amine salt in forming the amine clay complex. Where the clay is in the hydrogen form, for instance an acid treated bentonite, the amine itself may generally be employed.

In the subsequent description, the formation of modified clays will be described with reference to bentonite as the base-exchanging material. It will be understood that this is done solely for illustrative purposes and it will be appreciated from the examples that other base-exchanging materials may be employed in place of bentonite.

In general, for maximum dissociation of the amine salt and optimum dispersion of the bentonite, the reaction should be carried out in a liquid medium, preferably an aqueous medium and when so carried out, the amine-bentonite combination is formed as a substantially insoluble precipitate. Organic liquids, e. g., alcohol and acetone, in which the amine-bentonite combination is substantially insoluble, may also be employed. Thus, an aqueous slurry of bentonite containing, say, about 1 part bentonite in 25 parts of water may be admixed with a concentrated aqueous solution of the amine, as with a salt thereof. Many amines are not soluble in water to any substantial degree, and, therefore, the use of amine salts which are water soluble facilitates the formation of the amine-bentonite combination. The concentration of amine in aqueous solution is not of consequence, but for the sake of convenience in order to avoid the handling of excessive amounts of fluid, the solution should be employed as concentrated as possible.

The proportion of amine to bentonite may be varied considerably. In general, for optimum results, the proportion of amine to bentonite should be sufficient for complete exchange of all replaceable cations of the bentonite; however, the cases wherein there is an excess of bentonite with respect to the amine or an excess of the amine with respect to the replacable cations of the bentonite, are of interest in the practice of this invention.

When the amine-bentonite combination has been formed it may be used in the resulting slurry form for addition of the latices of elastomers, or it may be separated from the aqueous supernatant liquid by any convenient means, such as filtration, washed if desired, and added in this form to the latex of an elastomer or redispersed in water prior to addition to the latex.

The modified clay, preferably in the form of a water slurry, is mixed with the latex of an elastomeric material. The resulting mixture may be compounded in a manner well known to those skilled in the art and utilized in preparing reinforced latex films and products, or the mixture may be coprecipitated or coagulated by known methods, such as addition of salt, acid or alcohol, the supernatant aqueous liquid removed as by filtration, the product washed, if desired, and dried. The process may be carried out with the latex of any elastomer, including the latices of natural rubbers, butadienestyrene copolymers, chloroprene polymers and copolymers, vinylidine chloride polymers and copolymers, vinylchloride polymers and copolymers, butadieneacrylonitrile copolymers and mixtures of these polymers and copolymers.

It is well known that certain materials, such as carbon black, when incorporated into rubber, synthetic or natural, impart a substantial increase in the modulus and hardness of the final rubber product. In some cases, particularly with copolymers of butadiene, such addition materials, known as reinforcing fillers, greatly increase the tensile strength of the elastomeric composition.

It has been found that by compounding and vulcanizing the dried precipitated mixture previously described or by preparing films or other latex composition from the compounded latex-modified clay mixture that the resulting vulcanizates have increased hardness and modulus, and in the case of butadiene copolymers, increased tensile strength.

The degree of increase in hardness, modulus or tensile strength, is dependent on a number of factors including the onium compound used, the clay used and the nature and quantities of the compounding materials added. It will be appreciated that a wide variety of compounding materials, such as vulcanizing agents, accelerators of vulcanization, other elastomers, softeners, reinforcing fillers, extenders, and other modifying agents may be incorporated into the elastomeric composition to modify the properties of the elastomeric composition according to the art, and that such practice of the art does not depart from the spirit of this invention. It will also be appreciated that the reaction products of the base-exchange clays and various onium compounds may be used singly or in mixtures in the practice of this invention and that other compound materials, such as added fillers, may be added to the mixture to be precipitated or to the precipitated and dried mixture in accordance with the practice of this invention.

The examples which follow are given for illustrative purposes only. In the following examples of the practice of this invention, the onium compounds, such as dodecylamine hydrochloride, triphenyldodecylphosphonium bromide and a lauryl pyridinium compound were reacted with the base-exchange clay in aqueous medium and the latex of the elastomer added with stirring. The mixture of modified clay and latex was precipitated by addition of salt or acid or both salt and acid. The resultant precipitate was then washed, filtered and dried. The dried products were compounded according to the formulae shown and vulcanized in a platen press at 287° F. For the sake of convenience, the following base mix was used in the compounding of several of the illustrative examples which follow.

| Base mix | Parts by weight |
| --- | --- |
| Zinc Oxide | 3.0 |
| Mercaptobenzothiazole | 1.2 |
| Diortholylguanidine | 0.2 |
| Di-beta-naphthyl-p-phenylenediamine | 1.0 |
| Magnesium Oxide | 3.0 |
| Coumarone Indene Resin | 5.0 |
| Sulfur | 3.0 |
|  | 16.4 |

In each illustrative example shown below, the latex of the elastomer was precipitated with the modified clay and, where present, clay which is capable of base-exchange; the base mix and any other compounding ingredients were incorporated into the dried precipitated mixture. The physical properties of this vulcanized composition shown in the examples below are expressed in the following units: time, in minutes; tensile strength in pounds per square inch; modulus in pounds per square inch.

Example 1

| | Parts by weight |
| --- | --- |
| Butadiene-styrene 75:25 copolymer | 100.0 |
| Dodecylamine bentonite | 36.0 |
| Base mix | 16.4 |

| | Time of Cure | Tensile Strength | Per Cent Elongation | Modulus 300% Elong. | Shore A Hardness |
| --- | --- | --- | --- | --- | --- |
| Original | 90 | 1,570 | 645 | 405 | 62 |
| Aged 48 hr. at 100° C | 90 | 1,450 | 490 | 830 | 69 |

Example 2

| | Parts by weight |
| --- | --- |
| Butadiene-styrene 75:25 | 100.0 |
| Triphenyldodecylphosphonium bentonite | 43.0 |
| Base mix | 16.4 |

| | Time of Cure | Tensile Strength | Per Cent Elongation | Modulus 300% Elong. | Shore A Hardness |
| --- | --- | --- | --- | --- | --- |
| Original | 60 | 1,330 | 420 | 880 | 67 |
| Aged 48 hr. at 100° C | 60 | 1,345 | 290 |  | 70 |

Example 3

| | Parts by weight |
| --- | --- |
| Butadiene-styrene 75:25 copolymer | 100.0 |
| Dodecylamine hectorite | 36.0 |
| Base mix | 16.4 |

| | Time of Cure | Tensile Strength | Per Cent Elongation | Modulus 300% Elong. | Shore A Hardness |
| --- | --- | --- | --- | --- | --- |
| Original | 45 | 880 | 550 | 420 | 59 |
| Aged 48 hr. at 100° C | 45 | 1,000 | 330 | 940 | 67 |

Example 4

| | Parts by weight |
| --- | --- |
| Butadiene-styrene 75:25 copolymer | 100.0 |
| Aniline bentonite | 33.0 |
| Base mix | 16.4 |

| | Time of Cure | Tensile Strength | Per Cent Elongation | Modulus 300% Elong. | Shore A Hardness |
| --- | --- | --- | --- | --- | --- |
| Original | 120 | 910 | 580 | 300 | 58 |
| Aged 48 hr. at 100° C | 120 | 1,000 | 470 | 600 | 62 |

Example 5

| | Parts by weight |
| --- | --- |
| Butadiene-styrene 50:50 copolymer | 100.0 |
| Dodecylamine bentonite | 36.0 |
| Base mix | 16.4 |

| | Time of Cure | Tensile Strength | Per Cent Elongation | Modulus 300% Elong. | Shore A Hardness |
| --- | --- | --- | --- | --- | --- |
| Original | 30 | 2,000 | 540 | 600 | 67 |
| Aged 48 hr. at 100° C | 30 | 1,990 | 420 | 1,350 | 76 |

Example 6

| | Parts by weight |
| --- | --- |
| Butadieneacrylonitrile 75:25 copolymer | 100.0 |
| Dodecylamine bentonite | 36.0 |
| Base mix | 16.4 |
| Dibutyl phthalate | 15.0 |

| | Time of Cure | Tensile Strength | Per Cent Elongation | Modulus 300% Elong. | Shore A Hardness |
| --- | --- | --- | --- | --- | --- |
| Original | 30 | 1,375 | 480 | 500 | 65 |
| Aged 48 hr. at 100° C | 30 | 1,350 | 490 | 840 | 70 |

Example 7

| | Parts by weight |
| --- | --- |
| Butadiene-styrene 50:50 copolymer | 100.0 |
| Rosin amine bentonite | 40.0 |
| Base mix | 16.4 |

| | Time of Cure | Tensile Strength | Per Cent Elongation | Modulus 300% Elong. | Shore A Hardness |
| --- | --- | --- | --- | --- | --- |
| Original | 90 | 1,700 | 490 | 1,110 | 72 |
| Aged 48 hr. at 100° C | 90 | 1,850 | 380 | 1,640 | 75 |

Example 8

| | Parts by weight |
|---|---|
| Butadiene-styrene 50:50 | 100.0 |
| Melamine bentonite | 31.0 |
| Base mix | 16.4 |

| | Time of Cure | Tensile Strength | Per Cent Elongation | Modulus 300% Elong. | Shore A Hardness |
|---|---|---|---|---|---|
| Original | 90 | 1,400 | 710 | 420 | 55 |
| Aged 48 hr. at 100° C | 90 | 1,470 | 530 | 870 | 60 |

Example 9

| | Parts by weight |
|---|---|
| Butadiene-styrene 50:50 copolymer | 100.0 |
| Dodecylamine bentonite | 24.0 |
| Unreacted bentonite | 10.0 |
| Base mix | 16.4 |

| | Time of Cure | Tensile Strength | Per Cent Elongation | Modulus 300% Elong. | Shore A Hardness |
|---|---|---|---|---|---|
| Original | 90 | 1,900 | 630 | 740 | 63 |
| Aged 48 hr. at 100° C | 90 | 1,585 | 420 | 1,260 | 69 |

Example 10

| | Parts by weight |
|---|---|
| Butadienestyrene 50:50 copolymer | 100.0 |
| Lauryl pyridinium bentonite | 37.5 |
| Base mix | 16.4 |

| | Time of Cure | Tensile Strength | Per Cent Elongation | Modulus 300% Elong. | Shore A Hardness |
|---|---|---|---|---|---|
| Original | 60 | 2,070 | 430 | 1,200 | 74 |
| Aged 48 hr. at 100° C | 60 | 2,020 | 300 | 2,020 | 81 |

Example 11

| | Parts by weight |
|---|---|
| Natural rubber | 100.0 |
| Dodecylamine bentonite | 36.0 |
| Di-beta-naphthyl-p-phenylenediamine | 1.0 |
| Zinc oxide | 3.0 |
| Sulfur | 2.0 |
| Benzothiazyl disulfide | 0.75 |
| Stearic acid | 2.0 |
| Light process oil | 3.0 |

| | Time of Cure | Tensile Strength | Per Cent Elongation | Modulus 300% Elong. | Shore A Hardness |
|---|---|---|---|---|---|
| Original | 60 | 3,200 | 600 | 610 | 59 |
| Aged | 60 | 2,540 | 450 | 1,830 | 60 |

Example 12

| | Parts by weight |
|---|---|
| Neoprene 571 (d. r. c.) | 100.0 |
| Dodecylamine bentonite | 36.0 |
| Antioxidants | 2.5 |
| Zinc oxide | 5.0 |
| Magnesium oxide | 3.0 |
| Stearic acid | 0.5 |

| | Time of Cure | Tensile Strength | Per Cent Elongation | Shore A Hardness |
|---|---|---|---|---|
| Original | 60 | 1,350 | 260 | 86 |
| Aged | 60 | 1,485 | 240 | 89 |

In order to more fully illustrate the improvements derived from the practice of this invention, the properties of the various elastomers, compounded without the addition of the modified clays which are reinforcing agents are shown in the following tables.

Table I

| | Parts by weight |
|---|---|
| Butadiene-styrene 75:25 copolymer | 100.0 |
| Base mix | 16.4 |

| | Time of Cure | Tensile Strength | Per Cent Elongation | Modulus 300% Elong. | Shore A Hardness |
|---|---|---|---|---|---|
| Original | 60 | 420 | 360 | 200 | 52 |
| Aged 48 hr. at 100° C | 60 | 375 | 290 | ---------- | 54 |

Table II

| | Parts by weight |
|---|---|
| Butadiene-styrene 50:50 copolymer | 100.0 |
| Base mix | 16.4 |

| | Time of Cure | Tensile Strength | Per Cent Elongation | Modulus 300% Elong. | Shore A Hardness |
|---|---|---|---|---|---|
| Original | 60 | 1,560 | 590 | 140 | 45 |
| Aged 48 hr. at 100° C | 60 | 1,700 | 510 | 265 | 50 |

Table III

| | Parts by weight |
|---|---|
| Butadiene-acrylonitrile 75:25 copolymer | 100.0 |
| Base mix | 16.4 |
| Dibutyl phthalate | 15.0 |

| | Time of Cure | Tensile Strength | Per Cent Elongation | Modulus 300% Elong. | Shore A Hardness |
|---|---|---|---|---|---|
| Original | 60 | 350 | 250 | ---------- | 53 |
| Aged 48 hr. at 100° C | 60 | 410 | 240 | ---------- | 56 |

Table IV

| | Parts by weight |
|---|---|
| Natural rubber | 100.0 |
| Di-beta-naphthyl-p-phenylenediamine | 1.0 |
| Zinc oxide | 3.0 |
| Sulfur | 2.0 |
| Benzothiazyl disulfide | 0.75 |
| Stearic acid | 2.0 |
| Light process oil | 3.0 |

| | Time of Cure | Tensile Strength | Per Cent Elongation | Modulus 300% Elong. | Shore A Hardness |
|---|---|---|---|---|---|
| Original | 60 | 3,790 | 730 | 0 | 40 |
| Aged 48 hr. at 100° C | 60 | 460 | 430 | 180 | 43 |

Table V

| | Parts by weight |
|---|---|
| Neoprene 571 (d. r. c.) | 100.0 |
| Antioxidants | 2.5 |
| Zinc oxide | 5.0 |
| Magnesium oxide | 3.0 |
| Stearic acid | 0.5 |

| | Time of Cure | Tensile Strength | Per Cent Elongation | Modulus 300% Elong. | Shore A Hardness |
|---|---|---|---|---|---|
| Original | 60 | 480 | 140 | ---------- | 64 |
| Aged 48 hr. at 100° C | 60 | 710 | 180 | ---------- | 65 |

It will be readily understood that the above illustrative embodiments are to be broadly interpreted and not to be taken as limiting the scope of the invention claimed.

The invention having thus been described, what is claimed is:

1. A reinforced elastomer, comprising, an elastomer base selected from a group consisting of natural rubber, butadiene rubber copolymers and polychloroprene rubbers, and a modified clay originally exhibiting a base-exchange capacity of from 10 to 100, in which the inorganic cation has been replaced by a substituted organic onium base to the extent of at least 15 me/100 g. of the clay.

2. A reinforced elastomer, comprising, an elastomer base selected from a group consisting of natural rubber, butadiene rubber copolymers and polychloroprene rubbers, and a modified clay originally exhibiting a base-exchange capacity of from 10 to 100, in which the inorganic cation has been replaced by a substituted organic ammonium base to the extent of at least 15 me/100 g. of clay.

3. A reinforced elastomer, comprising, an elastomer base selected from a group consisting of natural rubber, butadiene rubber copolymers and polychloroprene rubbers, and a modified clay originally exhibiting a base-exchange capacity of from 10 to 100, in which the inorganic cation has been replaced by a substituted organic phosphonium base to the extent of at least 15 me/100 g. of the clay.

4. A reinforced elastomer, comprising, an elastomer base selected from a group consisting of natural rubber, butadiene rubber copolymers and polychloroprene rubbers, and a modified clay originally exhibiting a base-exchange capacity of from 10 to 100, in which the inorganic cation has been replaced by a substituted pyridinium base to the extent of at least 15 me/100 g. of the clay.

5. A reinforced elastomer, comprising, an elastomer base selected from a group consisting of natural rubber, butadiene rubber copolymers and polychloroprene rubbers, and a bentonite in which the inorganic cation has been replaced by a substituted organic onium base to the extent of at least 15 me/100 g. of the bentonite.

6. A reinforced elastomer, comprising, an elastomer base selected from a group consisting of natural rubber, butadiene rubber copolymers and polychloroprene rubbers, and a bentonite in which the inorganic cation has been replaced by a substituted organic ammonium base to the extent of at least 15 me/100 g. of the bentonite.

7. A reinforced elastomer, comprising, an elastomer base selected from a group consisting of natural rubber, butadiene rubber copolymers and polychloroprene rubbers, and a bentonite in which the inorganic cation has been replaced by a substituted organic phosphonium base to the extent of at least 15 me/100 g. of the bentonite.

8. A reinforced elastomer, comprising, an elastomer base selected from a group consisting of natural rubber, butadiene rubber copolymers and polychloroprene rubbers, and a bentonite in which the inorganic cation has been replaced by a substituted pyridinium base to the extent of at least 15 me/100 g. of the bentonite.

9. The process of compounding an elastomer selected from the group consisting of natural rubber, butadiene rubber copolymers and polychloroprene rubbers, comprising, mixing a suspension of an organic onium clay and the rubber latex in the presence of a suitable precipitating agent and recovering the precipitated coagulum formed.

10. The process of compounding an elastomer selected from the group consisting of natural rubber, butadiene rubber copolymers and polychloroprene rubbers, comprising, mixing a suspension of an organic onium-bentonite and the rubber latex in the presence of a suitable precipitating agent and recovering the precipitated coagulum formed.

11. The process of compounding an elastomer selected from the group consisting of natural rubber, butadiene rubber copolymers and polychloroprene rubbers, comprising, mixing a suspension of an amine-bentonite and the rubber latex in the presence of a suitable precipitating agent and recovering the precipitated coagulum formed.

12. The process of compounding an elastomer selected from the group consisting of natural rubber, butadiene rubber copolymers and polychloroprene rubbers, comprising, mixing a suspension of triphenyldodecylphosphonium-bentonite and the rubber latex in the presence of a suitable precipitating agent and recovering the precipitated coagulum formed.

13. The process of compounding an elastomer selected from the group consisting of natural rubber, butadiene rubber copolymers and polychloroprene rubbers, comprising, mixing a suspension of lauryl pyridinium-bentonite and the rubber latex in the presence of a suitable precipitating agent and recovering the precipitated coagulum formed.

LAWRENCE W. CARTER.
JOHN G. HENDRICKS.
DON S. BOLLEY.

REFERENCES CITED

The following references are of record in the file of this patent:

UNITED STATES PATENTS

| Number | Name | Date |
|---|---|---|
| 2,033,856 | Smith | Mar. 10, 1936 |
| 2,414,391 | Peaker | Jan. 14, 1947 |

OTHER REFERENCES

Chem. Abs., vol. 39, 1945, page 5874 45.

Ind. and Eng. Chem. article by Fisher., vol. 31, (pp. 941–945), August 1939.